United States Patent [19]

Perkins et al.

[11] Patent Number: 4,536,202

[45] Date of Patent: Aug. 20, 1985

[54] DRAIN BUSHING

[75] Inventors: Richard A. Perkins, Newark; William C. Brady, Granville, both of Ohio; Paul W. Turner, Aiken, S.C.

[73] Assignee: Owens-Corning Fiberglas Corporation, Toledo, Ohio

[21] Appl. No.: 558,681

[22] Filed: Dec. 6, 1983

[51] Int. Cl.³ .............................................. C03B 37/00
[52] U.S. Cl. ...................................... 65/1; 65/374.12; 420/443
[58] Field of Search ............ 420/443; 65/1, 2, 374.12; 148/426

[56] References Cited

U.S. PATENT DOCUMENTS

| | | | |
|---|---|---|---|
| 3,622,234 | 11/1971 | Seybolt et al. | 148/426 X |
| 3,640,705 | 2/1972 | Selman et al. | 75/172 |
| 3,754,902 | 8/1973 | Boone et al. | 420/443 |
| 3,754,903 | 8/1973 | Goward et al. | 420/443 |
| 4,155,731 | 5/1979 | Byrnes et al. | 65/1 |
| 4,274,852 | 6/1981 | McGarry | 65/2 |
| 4,402,767 | 9/1983 | Hinze et al. | 148/11.5 |

FOREIGN PATENT DOCUMENTS

| | | |
|---|---|---|
| WO81/00977 | 4/1981 | PCT Int'l Appl. . |
| WO81/01013 | 4/1981 | PCT Int'l Appl. . |
| 1977077 | 7/1977 | U.S.S.R. .............................. 65/1 |
| 893910 | 1/1981 | U.S.S.R. .............................. 65/1 |
| 895940 | 1/1982 | U.S.S.R. .............................. 65/1 |

Primary Examiner—Robert Lindsay
Attorney, Agent, or Firm—Ronald C. Hudgens; Robert F. Rywalski; Hiram P. Settle

[57] ABSTRACT

A drain bushing for a glass melting apparatus of integral design and machined from a single block of dispersion-strengthened, non-precious alloy. The bushing includes integrally formed mounting flange and molten glass well portions. The bushing contact ears may be either integrally formed or attached by welding, and the outlet tips may be integrally formed with the well portion or inserted into drain openings in the well portion.

3 Claims, 3 Drawing Figures

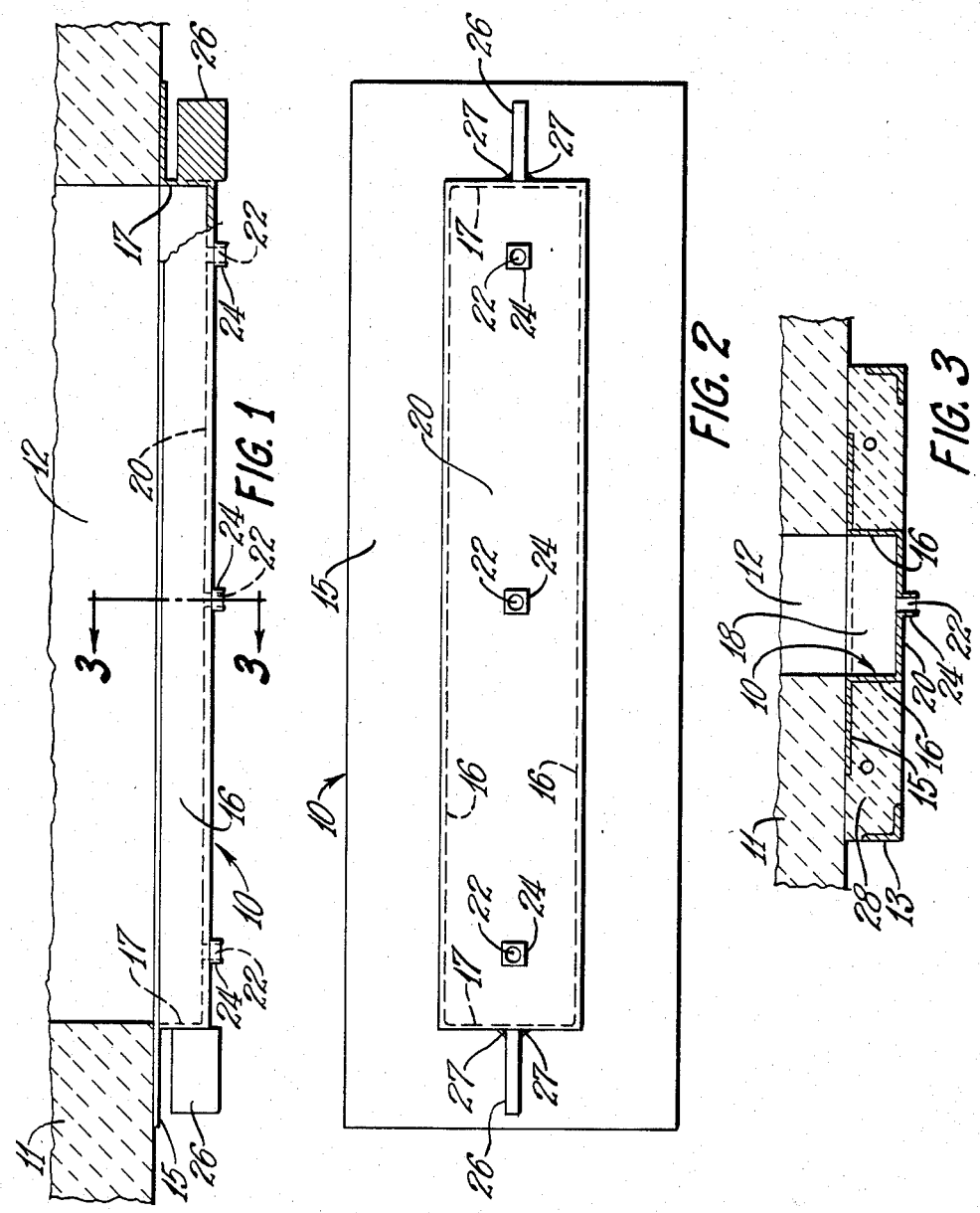

DRAIN BUSHING

TECHNICAL FIELD

This invention relates to a drain bushing for utilization with a glass melting apparatus, the bushing being formed from a dispersion-strengthened alloy.

BACKGROUND OF THE INVENTION

During the start-up of a glass fiberizing melter or furnace, it is necessary to operate the furnace for an extended period of time, on the order of 5 days, to flush out refractory residue from the construction of the furnace and to ensure stability of the heat pattern of the furnace and the composition of the glass being melted. During this period of time, molten glass must constantly flow from the furnace or "drain." Since the glass is not of commercial quality and the glass cannot be fiberized to form acceptable continuous fibers, the glass flows through a "drain bushing" rather than through a fiberizing bushing.

Such drain bushings, as conventionally utilized in the prior art, are formed of platinum or a platinum alloy, just as are the conventional fiberizing bushings. The conventional drain bushing is of concavo-convex interior configuration to define a glass receiving chamber having an open top surrounded by a peripheral flange which abuts against the lower surface of a conventional bushing block, so that glass from the furnace or forehearth drains directly into and through the drain bushing. Glass exists from the drain bushing through a limited number of tips, typically 3, of large diameter. Glass drained through the drain bushing is collected as cullet for disposal or remelting, as desired.

The use of platinum or platinum alloy drain bushings has been standard in the art, but such use results in the necessary expense of the precious metal forming the bushing, the necessity of maintaining a precious metal inventory tied up in such drain bushings, and the expense of control of the precious metal inventory. Consequently, considerable direct and indirect cost savings would result from the development of a drain bushing construction of non-precious metal.

BRIEF DESCRIPTION OF THE PRESENT INVENTION

The present invention now proposes the utilization of non-precious metal alloys in a drain bushing of more or less conventional configuration.

More specifically, the present invention proposes the manufacture of a drain bushing from a dispersion-strengthened alloy. Typical of such alloys are nickel, iron or cobalt-based alloys containing about 20% chromium and a refractory dispersant, such as yttrium oxide. Such alloys preferably are made by a mechanical alloying process, such as that disclosed in U.S. Pat. No. 3,749,612 to Benjamin et al.

The drain bushing of the present invention is preferably machined from a single block of dispersion-strengthened alloy of the character above described. In this manner, an integral structure including an upper mounting flange, a molten glass receiving well and well-draining apertures are formed. This avoids the necessity of forming a welded composite structure from the dispersion-strengthened alloy, which would be undesirable, since any such welded alloy does not retain its strength at the temperatures of the molten glass. The drain bushing electrical contact ears can be either integrally formed with the remainder of the drain bushing or may be welded to the rest of the structure since the ears are water-cooled by the conventional ear contacts and excessive temperatures at the ear are avoided. The drain apertures preferably are provided with depending tubular tips for conveying the molten glass from the well. These tips can either be integrally formed on the undersurface of the well portion or separate precious metal tips may be inserted into the drain apertures, if desired.

Testing of a drain bushing formed of dispersion-strengthened non-precious alloy as above described has demonstrated that such a drain bushing can be utilized for at least 5 days under actual plant operating conditions at molten glass temperatures.

BRIEF DESCRIPTION OF THE DRAWINGS

FIG. 1 is a vertical sectional view with parts shown in elevation of a drain bushing of the present invention as installed in a glass melting apparatus;

FIG. 2 is a bottom view of the drain bushing alone; and

FIG. 3 is a vertical sectional view taken along the plane 3—3 of FIG. 1.

DESCRIPTION OF THE PREFERRED EMBODIMENT

As illustrated in FIGS. 1 and 3, reference numeral 10 refers generally to a drain bushing of the present invention as installed in a glass melting furnace of the type utilized in the manufacture of glass fibers, the glass melting furnace including a conventional bushing block 11 formed of refractory material and having a central opening 12 through which molten glass flows from the glass heating and melting portions of the furnace. The drain bushing 10 is mounted to the undersurface of the bushing block 11 in the conventional manner and utilizing the conventional furnace structure, including an angle iron 13 forming a part of the furnace support structure.

The drain bushing 10 includes an upper, outwardly-directly planar flange 15 which abuts the undersurface of the bushing block 11 in surrounding relation to the bushing block passage 12 as will be seen from FIGS. 1 and 3. Integrally formed with the mounting flange 15 and depending therefrom are side walls 16 and end walls 17 surrounding an interior molten glass receiving well portion 18 overlying an integrally formed, horizontal bottom wall 20.

The bottom wall 20 is provided with a plurality of drain apertures 22, three such apertures being provided in the bottom wall 20 in the illustrated embodiment of the invention. The drain apertures 22 communicate with integrally formed, depending tips 24 which ensure that the molten glass from the well portion 18 does not wet the undersurface of the bottom plate 20. The tips 24 are square in cross-section to facilitate machining.

The drain bushing 10 also is provided with a pair of electrical contact ears 26 of generally rectangular configuration integrally formed with or joined to the end walls 17 in spaced relation beneath the flange 15 to extend generally vertically, as illustrated in FIGS. 1 and 2. These ears 26 are adapted to receive current from the conventional water-cooled ear clamps for a conventional fiberizing bushing. As above explained, the ears may be integrally formed with the remainder of the bushing or they can be added by welding. The ears are joined, in either event, to the end walls 17 by fillets 27 which must be of relatively small diameter to allow the water-cooled clamps (not shown) to be positioned immediately ajacent the end wall-ear juncture. If the end wall-ear juncture is not sufficiently cooled, the ear may burn off from the bushing heating current.

As is conventional in the art, the space between the supporting angle iron 13 and the side and end walls 16, 17 of the bushing is filled with castable refractory 28 to prevent ambient cooling of these walls of the bushing. This castable refractory 28 may have a conventional air or water cooling coil embedded therein adjacent the juncture between the castable refractory 28 and the overlying bushing block to prevent any glass leakage at the joint between the drain bushing flange 15 and the bushing block.

As heretofore explained, the bushing block 10 is formed of a dispersion-strengthened, non-precious metal alloy. Alloys containing primarily nickel, iron or cobalt and about 20% chromium are particularly preferred. A refractory dispersant is also included in the alloy, and these dispersoids may be a metal oxide, metal carbide, metal silicide, metal nitride or a metal boride, which is present in an effective dispersion strengthening amount. Usually such amounts will be between about 0.1% and about 5.0% by volume. The preferred dispersoid is yttrium oxide.

One of the preferred alloys of the present invention is a ferritic alloy which consists essentially of, by weight, from about 13% to about 35% chromium, about 0.2% to less than about 2% titanium, about 2% to about 7% aluminum, and a small but effective amount of yttria to yield sufficient high temperature strength, i.e., up to less than about 2% yttria, and the balance, apart from incidental elements and impurities, essentially iron. Another preferred alloy is a dispersion-strengthened austenitic alloy which consists essentially of, by weight, approximately 16% to 35% chromium, 0 to about 1% carbon, 0 to about 5% aluminum, 0 to about 2% titanium, 0.4 to about 2% yttria and the balance, apart from incidental elements and impurties, is made up of nickel.

One specifically preferred alloy of the present invention is an Incoloy alloy MA 956, which is commercially available from International Nickel Company. This alloy has the composition: chromium 20%, aluminum 4.5%, titanium 0.5%, yttrium oxide 0.5% and the balance iron. Another specifically preferred alloy of the present invention is Inconel alloy MA 754, also commercially available from International Nickel Company, and consisting essentially of: chromium 20%, carbon 0.05%, aluminum 0.3%, titanium 0.5%, yttrium oxide 0.6%, iron 1.0%, and the balance nickel. The alloy block is recrystallized before machining. For the above fenitic alloy, the material is treated for two hours at 2550° F. For the nickel alloy, the recrystallization takes two hours at 2420° F.

Thus, it will be seen that the present invention provides a novel non-precious alloy drain bushing which is effective in use, which eliminates the direct and indirect expense of platinum or platinum alloys, and which is of integral structure capable of withstanding the rigorous service requirements of such bushings.

We claim:

1. A drain bushing for use as a temporary replacement for a production bushing to drain molten glass from a glass melting apparatus including a lower bushing block having a bottom opening and formed of refractory material, the improvements wherein said drain bushing is machined from a single block of dispersion-strengthened, non-precious metal alloy, the machined bushing having (a) an integral upper outwardly-directed mounting flange for abutment with said bushing block to surround the bottom opening therein, (b) an integral central open-topped, convexo-concave well portion beneath said mounting flange for registry with the bushing block bottom opening and having a bottom wall provided with (c) integrally formed tips of rectangular exterior configuration having axial drain passage communicating with the well portion, and electrical contact ears of the same dispersion-strengthened alloy located exteriorally of said well portion and beneath said mounting flange.

2. A drain bushing as defined in claim 1 wherein the contact ears are integrally formed with the remainder of the bushing.

3. A drain bushing as defined in claim 1 wherein the contact ears are welded to the remainder of the bushing.

* * * * *